(12) United States Patent
Roe et al.

(10) Patent No.: US 7,552,113 B2
(45) Date of Patent: Jun. 23, 2009

(54) SYSTEM AND METHOD FOR MANAGING SEARCH RESULTS AND DELIVERING ADVERTISING AND ENHANCED EFFECTIVENESS

(76) Inventors: Robert D. Roe, 105 W. 13th St., #8C, New York, NY (US) 10011; Jack Odell, 18 Asticou Rd., N1, Jamaica Plain, MA (US) 02130

( * ) Notice: Subject to any disclaimer, the term of this patent is extended or adjusted under 35 U.S.C. 154(b) by 203 days.

(21) Appl. No.: 11/600,475

(22) Filed: Nov. 16, 2006

(65) Prior Publication Data

US 2008/0120278 A1  May 22, 2008

(51) Int. Cl.
*G06F 17/20* (2006.01)
(52) U.S. Cl. .................. 707/3; 707/104.1; 707/205
(58) Field of Classification Search .............. 707/1–7, 707/205
See application file for complete search history.

(56) References Cited

U.S. PATENT DOCUMENTS

| | | | | |
|---|---|---|---|---|
| 5,621,880 A * | 4/1997 | Johnson | .................. | 715/783 |
| 5,708,775 A * | 1/1998 | Nakamura | ................... | 714/48 |
| 6,018,344 A * | 1/2000 | Harada et al. | ............... | 715/818 |
| 6,567,805 B1 * | 5/2003 | Johnson et al. | ............... | 707/5 |
| 6,667,751 B1 * | 12/2003 | Wynn et al. | .................. | 715/833 |
| 7,062,475 B1 * | 6/2006 | Szabo et al. | ................... | 706/11 |
| 7,386,794 B2 * | 6/2008 | Fujiwara | ..................... | 715/704 |
| 2002/0062341 A1 * | 5/2002 | Sueki et al. | .................. | 709/203 |
| 2006/0218146 A1 * | 9/2006 | Bitan et al. | ..................... | 707/7 |
| 2007/0162424 A1 * | 7/2007 | Jeh et al. | ........................ | 707/2 |
| 2007/0162524 A1 * | 7/2007 | Coe et al. | .................. | 707/205 |
| 2007/0276810 A1 * | 11/2007 | Rosen | .......................... | 707/3 |

* cited by examiner

*Primary Examiner*—Don Wong
*Assistant Examiner*—Hanh B Thai
(74) *Attorney, Agent, or Firm*—Timothy P O Hagan

(57) ABSTRACT

A search result management system manages search results provided by each of a plurality of remote search engines and provides targeted advertisement content. The system comprises a search result management component capturing at least one search session executed by a first user interface object. Capturing the search session comprises capturing at least one query session. Capturing each query session comprises: i) capturing a search query posted to a selected search engine; and ii) capturing at one search result item returned by the selected search engine. A user interface object generates an advertisement request to a distribution object and receives an advertisement impression from the distribution object. The advertisement request includes at least on equerry parameter derived from the captured search query. A display of the advertisement impression is rendered in conjunction with a display of the at least one search result item returned by the selected search engine in a user interface object separate and distinct from the first user interface object.

8 Claims, 8 Drawing Sheets

```
<?xml-stylesheet type="text/xsl" href="test.xsl"?>
<sh>
  <ses>
    <saved status>"0"</saved status>  ~49
    <id>"83838478391"</id> ~48
    <sdate>"2006/10/24 14:10:32"</sdate>
    <edate>"2006/10/25 16:40:52"</edate>
    <q>
      <ref>http://www.searchme.com"</ref> ~52
      <saved status>"0"</saved status>  ~49
                    ~44
      <trm>cars</trm> ~54
      <dt>2006/10/24 14:10:32</dt> ~56
      <c>
        <i>                                    ~45b
          <url>http://www.searchme.com</url> ~62
                          ~45a
          <ttl>Satellite Radio</ttl> ~64
          <dt>2006/10/24 14:10:38</dt> ~66
        </i>
        <i>
          <url>http://www.xyzsatellite.com</url>
          <ttl>The Best Radio Programming</ttl>
          <dt>2006/10/24 14:10:38</dt>
        </i>
      </c>
    </q>
  </ses>
</sh>
```

Figure 2

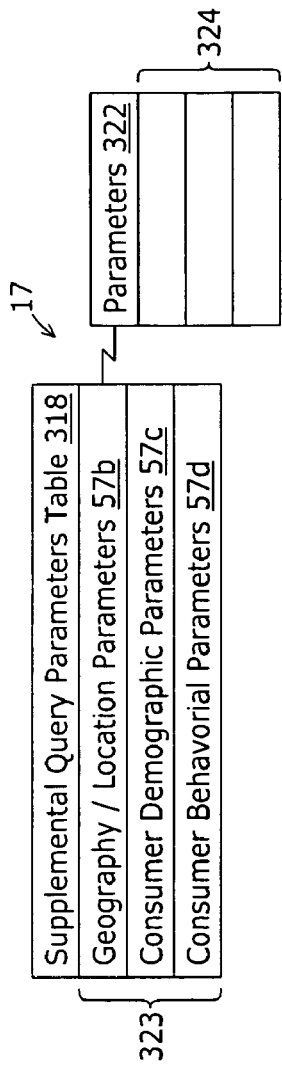
Figure 6
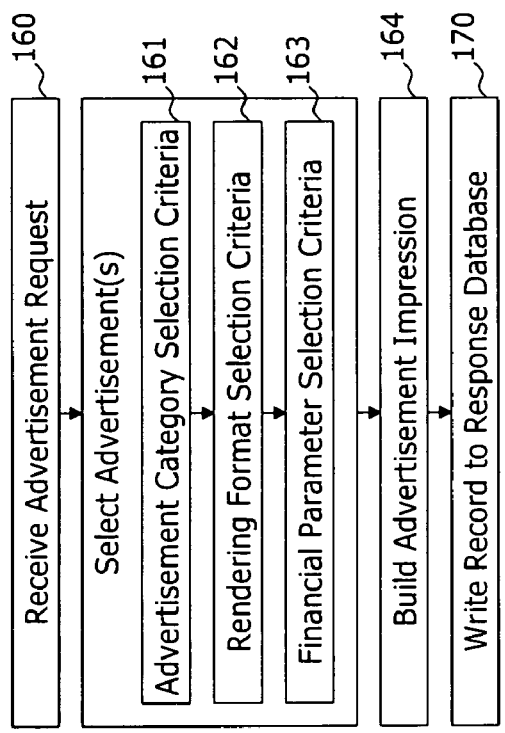
71 — {http://AdURL/AdRequestDef?FormatID=(ID#)&QueryParameter=(QueryParameter)...
Figure 7
Figure 8

SYSTEM AND METHOD FOR MANAGING SEARCH RESULTS AND DELIVERING ADVERTISING AND ENHANCED EFFECTIVENESS

TECHNICAL FIELD

The present invention relates to a system and method for managing search results and delivering targeted advertising with enhanced effectiveness and, more particularly, to a client system for managing historical search result data and obtaining targeted advertisement content for rendering therewith.

BACKGROUND OF THE INVENTION

In first field of art, providers of Internet or web search services commonly make their search services available over the Internet. A user may access a search engine by directing a web browser application to a URL associated with the search engine. A web server returns a web document (typically an HTML document) which captures a search query input by the user and posts the search query to the provider's search engine systems.

The provider's search engine systems generate search results which are embodied in results document (again, typically an HTML document) which is returned to the browser for display.

Typically the search results include a listing of a plurality of web documents that include content related to the search query. The results document typically includes, for each of such web documents, an active hyperlink to the URL from which the document can be obtained. As such, the user may browse the results by "clicking" each result to direct his or her browser to the URL and obtain the document.

In addition to including the search results, the results document also may include "sponsored results" or other advertisements. Typically the sponsored results or other advertisements are within a category of advertisements that are associated with the search query. As with the search results, the web document includes, for each sponsored result or advertisement, an active hyperlink to a URL associated with the advertisement (or to a URL that will redirect the browser to a hyperlink associated with the advertisement.

One aspect of such existing architecture for accessing a search engine providers systems, from the perspective of the user, is that the results are not saved on a default basis and the results are not static. More specifically, unless the user manually uses his or her browser's capabilities for storing the HTML search results document, the search results will be lost when the web browser window is closed. Further, each time the user re-initiates a search query the search results provided by the search engine systems may be different.

From the perspective of the search engine service provider, the fact that search results are not saved on a default basis can be a benefit. Each time the user initiates a search query, the search engine service provider has a new opportunity to deliver different sponsored links or other advertisement to the user.

However, from the perspective of the user this existing architecture can create a challenging and frustrating situation in that the user may locate a search result document in a first search session but is unable to locate the same document in subsequent search sessions.

What is needed is a system and method for managing historical search results wherein search results are not lost when the web browser session with the search engine systems is closed. Further, what is needed a system and method for managing historical search results and enabling delivery of new sponsored links or advertisements in conjunction with a display of historical search results.

SUMMARY OF THE INVENTION

A first aspect of the present invention comprises a search history result management system for managing search results provided by each of a plurality of remote search engines. Such first aspect further comprises providing targeted advertisement content in conjunction with managing such search results.

The system may comprise a web browser for maintaining at least one search session. Each search session comprises at least one query session. Each query session may be with a selected search engine. The selected search engine may be one of the plurality of remote search engines.

The query session comprises: i) posting a search query to the selected search engine; ii) receiving at least one search result item returned by the selected search engine; and ii) displaying the search query and the at least one search result item in a first user interface object such as a browser window.

A search result management system (e.g. a DLL component) captures the at least one query session. In more detail, the search result management system may capture the search query and the at least one search result item.

The search result management system (e.g. a GUI object component) generates an advertisement request to a distribution object. The advertisement request includes at least one query parameter derived from the captured search query. The search result management system receives an advertisement impression in response to the advertisement request and displays, in the GUI object, which is separate and distinct from the first user interface object: i) the at least one search result item returned by the selected search engine; and ii) the advertisement impression returned by the distribution object.

The search result management system may further comprise a search history object. The search history object may be an XML file. The search history object stores at least one query node. Each query nodes represents one of the query sessions. Each query node may comprise: i) an identification of the selected search engine; ii) an indication of the search query posted to the selected search engine; and iii) an indication of the at least one result item returned by the selected search engine.

The GUI object further comprises a search session display. The search session display comprises at least one search query object. Each search query object corresponds to at least one query node of the search history object and may display: i) the identification of the selected search engine; ii) the indication of the search query; and ii) the indication of the at least one search result item.

Each query node of the search history object may include at least one selected result item node. Each selected item node includes the indication of that at least one result item that was clicked-through by the user in the first user interface object. In such embodiment, each of the query objects of the GUI object comprises an indication of only those at least one search result items represented by a selected result item node of the query node of the search history object.

A second aspect of the present invention also comprises a search history result management system for managing search results provided by each of a plurality of remote search engines. Again, such second aspect further comprises providing targeted advertisement content in conjunction with managing such search results.

The system comprises a search management component (e.g. a DLL component) and a user interface object (a GUI object component). The search result management component captures at least one search session executed by a first user interface object (such as a web browser session). Capturing each search session comprises capturing at least one query session. Capturing each query session comprises capturing a search query posted by the first user interface object to a selected search engine and capturing at least one search result item returned by the selected search engine. The selected search engine may be a one of the plurality of remote search engines.

The user interface object generates an advertisement request to a distribution object. The advertisement request includes at least one query parameter derived from the captured search query. In response to the advertisement request, an advertisement impression is received from the distribution object and rendering, in the user interface object, as a display in conjunction with a display of the at least one search result item returned by the selected search engine.

The search result management system may further comprise a search history object. The search history object may be an XML file. The search history object stores at least one query node. Each query node represents a one of the query sessions and comprises: i) an identification of the selected search engine; ii) an indication of the search query posted to the selected search engine; and iii) an indication of the at least one result item returned by the selected search engine.

The user interface object further comprises a search session display. The search session display comprises at least one search query object. Each of the search query objects correspond to at least one query node of the search history object and may display: i) the identification of the selected search engine; ii) the indication of the search query; and ii) the indication of the at least one search result items.

A third aspect of the present invention comprises a method for managing search results provided by each of a plurality of remote search engines and providing targeted advertisement content for rendering therewith.

The method comprises capturing at least one query session of a web browser search session. Each query session may be with a selected search engine. The selected search engine may be a one of the plurality of remote search engines.

The query session comprises: i) posting a search query to the selected search engine; ii) receiving at least one search result item returned by the selected search engine; and ii) displaying the search query and the at least one search result item in a first user interface object controlled by the web browser search session.

Capturing the query session comprises capturing the search query and the at least one search result item.

The method further comprises generating an advertisement request to a distribution object and receiving an advertisement impression in response thereto. The advertisement request includes a least one query parameter derived from the captured search query.

The method comprises displaying, in a second user interface object distinct from the first user interface object, the at least one search result item returned by the selected search engine and the advertisement impression returned by the distribution object.

The method may further comprise storing, in search history object, at least one query node. Each of the query nodes may represent a one of the query sessions and comprise: i) an identification of the selected search engine; ii) an indication of the search query; and iii) an indication of the at least one result item returned by the selected search engine.

The method may further yet comprise displaying a search session display in the second user interface object. The search session display comprises at least one search query object. Each of the search query objects corresponds to at least one query node of the search history object and may display: i) the identification of the selected search engine; ii) the indication of the search query; and iii) the indication of the at least one search result items.

Storing the identification of the session search engine, the indication of the search query, and the indication of the at least one result items in the search history object comprises storing such information as XML tagged data in an XML file.

The query node may comprise at least one selected item node. Each selected item node includes the indication of that at least one result item that was clicked-through by the user in the first user interface object. In such embodiment, each of the query objects of the GUI object comprises an indication of only those at least one search result items represented by a selected result item node of the query node of the search history object.

For a better understanding of the present invention, together with other and further aspects thereof, reference is made to the following description, taken in conjunction with the accompanying drawings. The scope of the present invention is set forth in the appended claims.

BRIEF DESCRIPTION OF THE DRAWINGS

FIG. 2 is an exemplary structure of an exemplary search history object in accordance with one embodiment of the present invention;

FIG. 6 represents an exemplary supplemental query parameters object in accordance with one embodiment of the present invention;

FIG. 7 represents an exemplary advertisement request in accordance with one embodiment of the present invention;

FIG. 8 is a flow chart representing exemplary operation of a distribution object in accordance with one embodiment of the present invention;

DETAILED DESCRIPTION OF THE EXEMPLARY EMBODIMENTS

Figure 1:
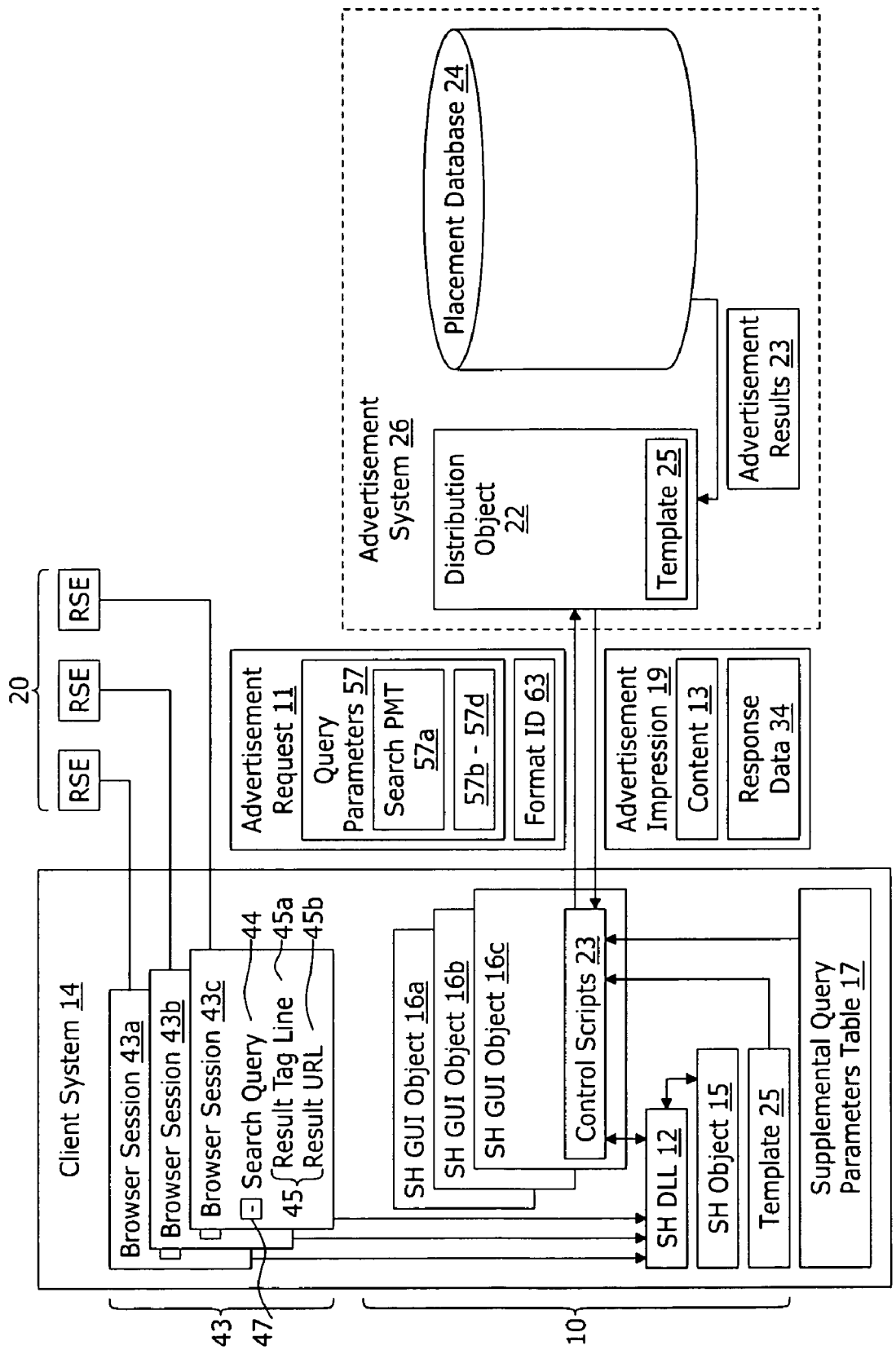
FIG. 1 is a block diagram represents an exemplary architecture of a system for rendering one or more search history GUI objects on a client system in accordance with one embodiment of the present invention.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

It should also be appreciated that table structures represented in this application are exemplary only and intended to show the mapping of relationships between various data elements. Other table structures may store similar data elements in a manner that maintains the relationships useful for the practice of the present invention.

The block diagram of FIG. 1 represents an exemplary architecture for rendering one or more search history GUI objects 16a-16c (each of which may be referred to herein as enabling a Searchographer) on a client system 14.

The client system 14 may be a desktop computer, a notebook computer, a PDA, or any other device with a general purpose operating system capable of operating web browser software 43 and a historical search result management system 10.

In general, the web browser software 43 may, in a traditional manner, be used to open multiple web browser user interface objects 43a-43c (which may be referred to herein as browser windows or browser sessions) for obtaining and displaying web documents from multiple web servers. For purposes of describing the present invention, each of the multiple browser sessions 43a-43c may include a TCP/IP connection to one of a plurality of remote search engines 20 and, using web browser session 43c as an example, the web document provided by each remote search engine 20 may include display of a search query 44 posted to the remote search engine 20 by the browser session 43c and a plurality of result items 45 returned by the remote search engine 20. Each result item 45 may include a tagline 45a as well as a result URL 45b in a formatted rendering such that if clicked, or otherwise activated by the user, the browser session 43 will establish a TCP/IP connection to such result URL 45b.

In the exemplary embodiment, the historical search result management system 10 comprises a search history DLL object 12, a search history object 15, and each of a the one or more search history GUI objects 16a-16c.

The search history DLL object 12 may be an executable object which is launched upon boot up of the client system 14 and, in operation monitors activity of the web browser software 43 such it: i) captures each search query 44 posted to a remote search engine 20 through a browser session 43a-43c and the search result items 45 returned in response thereto; and ii) stores such captured search query 44 and selected ones of the search result items 45 in the search history object 15.

In an exemplary embodiment, the selected ones of the search result items 45 which are stored in the search history object 15 comprises those search result items 45 which have been "clicked through" or otherwise selected or "visited" by the user of the client system 14. The "click through" or, selection, or other event within the web browser session 43 that links the user to the result URL 45b is referred to as a click through event.

Turning briefly of FIG. 2 in conjunction with FIG. 1, the search history object 15 may be structured as an XML file. In general, such XML file is structured to include a plurality of search session nodes 46, each of which is identified by a Session Identifier 48.

Within each search session node 46 are a plurality of query nodes 50. Each query node 50 is identified by a combination of: i) a reference URL indicator 52 which identifies the remote search engine 20 with which the search was conducted; ii) a search query indicator 54 which identifies the search query 44 posted to the remote search engine 20; and iii) a date/time indicator 56 which identifies the date and time the search was performed.

Within each query node 50 are a plurality of selected result item nodes 58, each of which represents a one of those selected those search result items 45 which have been "clicked through" or otherwise selected or "visited" by the user of the system 14. Each result node 58 includes: i) a URL indicator 62 which identifies the URL 45b to which the user "clicked through" in the browser session 43; ii) a tagline indicator 64 which may be the tagline 45a for the result item 45 as provided by the remote search engine 20; and iii) a date/time indicator 66 which identifies the date and time of the click through event in the browser session 43.

In the exemplary embodiment the query nodes 50 within each session node 46 reflect queries made within the same browser session 43. As such, the Session Identifier 48 may be the browser session ID which identifies the browser session 43 within which the search queries were made.

Returning to FIG. 1, in addition to monitoring browser activity and storing captured search query and selected result data in the search history object, the search history DLL 12 controls the spawning of each of the plurality of search history GUI object 16a-16c. In more detail, the search history DLL 12 may be configured to spawn a search history GUI object 16: i) in response to user activation of a designated toolbar control 47 within a particular browser session 43; or ii) in response to a click through event if such click through event is the first click through event to occur within a particular browser session 43.

If the search history GUI object 16 is spawned in response to user selection of a designated toolbar control 47 within a browser session 43, such spawned search history GUI object 16: i) will be assigned an object identifier which corresponds to the browser ID of the browser session 43 in which the toolbar control 47 was selected; and ii) may be rendered as a new window of the desktop of the client system 14 "above" such browser session 43.

If the search history GUI object 16 is spawned in response to a click through event within a browser session 43, such spawned search history GUI object 16: i) will be assigned an object identifier which corresponds to the browser ID of the browser session 43 in which the click through event occurred; and ii) may be rendered as a window of the same size and aspect ratio as such browser session 43 and positioned "below" such browser session on the desktop of the client system 14.

Figure 3:
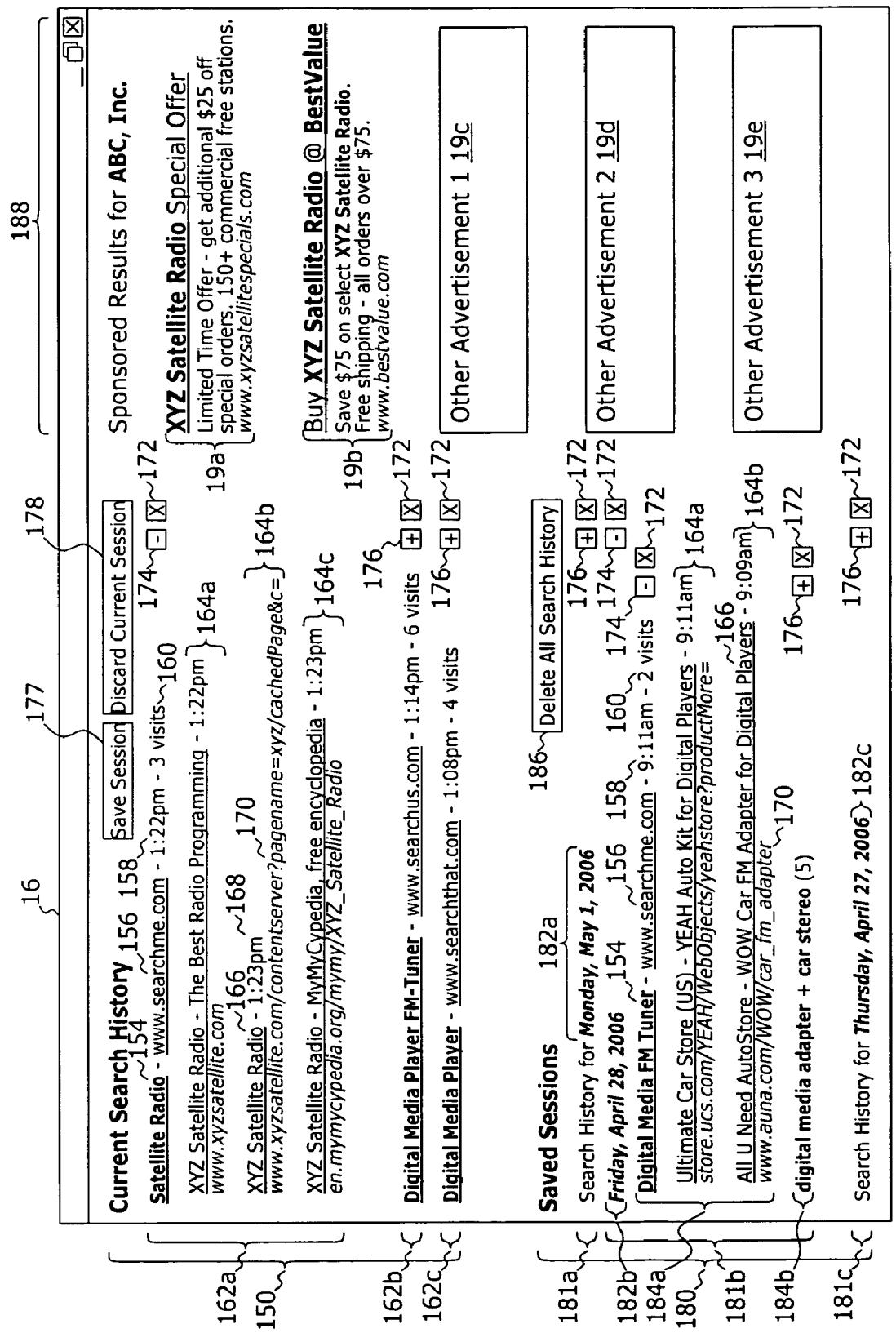
FIG. 3 is a diagram representing an exemplary search history GUI object in accordance with one embodiment of the present invention.

The diagram of FIG. 3 represents an exemplary rendering of a search history GUI object 16. With reference to FIG. 3 in conjunction with FIG. 2, the exemplary search history GUI object 16 may include a current search history portion 150, a saved search history portion 180, and a sponsored results and other advertisement portion 188. It should be appreciated that the particular layout of the rendering of FIG. 3 is exemplary only.

The current search history portion 150 includes a plurality of search query objects 162a-162c. Each search query object 162a-162c within the current search history portion 150 represents at least one query node 50 within the current session node 46 of the search history object 15. The current session node 46 is the session node 46 that is: i) identified by a session identifier 48 which corresponds to the object identifier of the search history GUI object 16; and ii) includes a value within a saved status indicator 49 which indicates that the session is current—as opposed to saved.

As such, the query objects 162a-162c represent the search queries executed within a single browser session 43—such single browser session having a browser ID that was assigned to the search history GUI object 16 as its object identifier upon spawning of such search history GUI object 16.

Each search query object (using search query object 162a as an example) may include: i) an update search hyperlink 154 which may be a formatted display of the search query 44 of the search query indicator 54 of the query node 50; ii) a remote search engine hyperlink 156 which may be a formatted display of the URL of the search engine 20 of the URL indicator 52 of the query node 50; iii) a date/time indicator 158 which may be a formatted display of the date/time of the date/time indicator 56 of the query node 50; and v) a visits indicator 160 which may indicate the quantity of selected result nodes 58 within the query node 50 thereby representing the quantity of resulting URLs from the original search which were visited (e.g. click through) during the browser session.

Further, each search query object (again using search query object 162a as an example) may include a plurality of visited result objects 164a-164c, each of which represents a result node 58 within the query node 50.

Each visited result object (using visited result object 164b as an example) may include: i) a visited result hyperlink 166 which may be a formatted display of the text based tagline 45a of the tagline indicator 64 of the result node 58; ii) a date/time display 168 which may be a formatted display of the date/time of the date/time indicator 66 of the result node 58; and iii) a URL display 170 which may be a formatted display of the URL 45b of the URL indicator 62 of the result node 58.

Further, each search query object 162 may include: i) an optional delete control 172 for removing the search query object 162 from the display; ii) a visited results collapse control 174 (represented in search query object 162a) for transition the search query object 162 from a state wherein the visited results objects 164 within the search query object 162 are shown (visible) to a state wherein the visited results objects 164 are not shown (hidden); and iii) a results expansion control 176 (represented in search query objects 162b and 162c) for transition the search query object 162 from a state wherein the visited results objects 164 within the search query object 162 are not shown to a state wherein the visited results objects 164 are shown.

The historical search history portion 180 includes a plurality of temporal objects 181a-181c. Each temporal object 181a-181c represents a predetermined historical time period which, in the exemplary embodiment is one day as indicated by a date label 182a-182c. Each temporal object 181 (using temporal object 181b as an example) may include a plurality of search query objects 184a-184b.

Each search query object 184a-184b within a particular temporal object (again using temporal object 181b as an example) represents at least one query node 50 wherein the at least one query node 50: i) includes a saved status identifier value indicating that the query node 50 has been saved; or ii) is within any session node 46 which includes a saved status identifier 49 value indicating that the session has been saved; and, in either case, includes a date time indicator 46 value which falls within the predetermined historical time period of the temporal object 181b.

Each search query object (using search query object 184a as an example), like each search query object 162, may include: i) an update search hyperlink 154 which may be a formatted display of the search query 44 of the search query indicator 54 of the query node 50; ii) a remote search engine hyperlink 156 which may be a formatted display of the URL of the search engine 20 of the URL indicator 52 of the query node 50; iii) a date/time display 158 which may be a formatted display of the date/time of the date/time indicator 56 of the query node 50; and v) a visits indicator 160 which may indicate the quantity of selected result nodes 58 within the query node 50.

Further, each search query object (again using search query object 184a as an example) may include a plurality of visited result objects 164a-164b, each of which represents a result node 58 within the query node 50. Again, each visited result object (using visited result object 164b as an example) may include: i) a visited result hyperlink 166 which may be a formatted display of the text based tagline 45a of the tagline indicator 64 of the result node 58; ii) a date/time display 168 which may be a formatted display of the date/time of the date/time indicator 66 of the result node 58; and iii) a URL display 170 which may be a formatted display of the URL 45b of the URL indicator 62 of the result node 58.

Further, each search query object 184 may include: i) an optional delete control 172 for removing the search query object 184 from the display; ii) a visited results collapse control 174 (represented in search session object 184a) for transitioning the search session object 184 from a state wherein the visited results objects 164 within the search session object 184 are shown (visible) to a state wherein the visited results objects 164 are not shown (hidden); and iii) a results expansion control 176 (represented in search query object 184b) for transitioning the search query object 184 from a state wherein the visited results objects 164 within the search query object 162 are not shown to a state wherein the visited results objects 164 are shown.

Further, each temporal object 181a-181c may further include: i) an optional delete control 172 for removing the temporal object (and all of its embedded search query objects 184) from the search history GUI 16; ii) a results collapse control 174 (represented in temporal object 181b) for transition the temporal object 181 from a state wherein its embedded search query objects 184 are shown to a state wherein its search query objects 184 are not shown; and iii) a results expansion control 176 (represented in temporal objects 181a and 181c) for transitioning the temporal object 181 from a state wherein its embedded search query objects 184 are not shown to a state wherein its search query objects 184 are shown.

The search history GUI object 16 may further include a save session control 177 associated with the current search history portion 150. As will be discussed in more detail herein, the save session control 177 is effective to convert the session node 46 which corresponds to the current search history portion 150 to a saved status in the search history object 15. As a result, upon activation of the save session control 177, each of the search query objects 162 are converted to search query objects 184 within an appropriate temporal object 181 of the saved search history portion 180 (e.g. the search query object are moved).

The search history GUI object 16 may further include a discard current session control 178 associated with the current search history portion 150. As will be discussed in more detail herein, the discard current session control 178 is effective to remove the session node 46 which corresponds to the current search history portion 150 from the search history object 15. As a result, upon activation of the discard current session control 178, each of the search query objects 162 within the current search are deleted.

The search history GUI object 16 may further yet include a delete all search history control 186 associated with the saved search history portion 180. As will be discussed in more detail herein, the delete all search history control 186 is effective to delete from the search history object 15, each query node 50 and each session node 46 represented by the query objects 184 of the temporal nodes 181 of the saved search history portion 180.

The sponsored link and advertisement portion 188 may include a plurality of advertisement impressions 19a-19e. Each advertisement impression 19a-19e may be any of a graphic, text, or motion video advertisement suitable for rendering within the search history GUI object 16. Further, any of the graphics, text, or motion video formatted advertisement impressions 19a-19e may optionally include corresponding audio content for rendering by a speaker (not shown) associated with the client system 14.

With reference to FIG. 3 on conjunction with FIG. 1, each advertisement impression 19a-19e may be obtained by the search history GUI object 16 generating an advertisement request 11 to an advertisement system 26 and receiving, in response, an advertisement impression 19. A more detailed discussion of the advertisement request 11 and the systems and methods for selection of advertisement content 13 of the advertisement impression 19 is included herein.

The SH GUI object 16 may be an HTML document rendered on the client system 14. The contents and operation of the search history GUI object 16 may be controlled by embedded control script 23. In the exemplary embodiment, the control script 23 may be JAVA script, ActiveX code, or similar script level instructions for interpretation and/or execution by the client system 14.

In the exemplary embodiment, the search history DLL 12 spawns the search history GUI object 16 from a document template 25. The document template 25 may be a known extensible style sheet format document such as an XSL or XSLT document. The document template 25 may be stored locally on the client system 14 or may be obtained from a remote distribution object 22 over a network connection thereto.

Upon spawning of the search history GUI object 16, the control script 23 commences operation such that the search history GUI object 16 is appropriately rendered on the client system 14. The flow chart of FIG. 4 represents exemplary operation of the control script 23.

Figure 4:
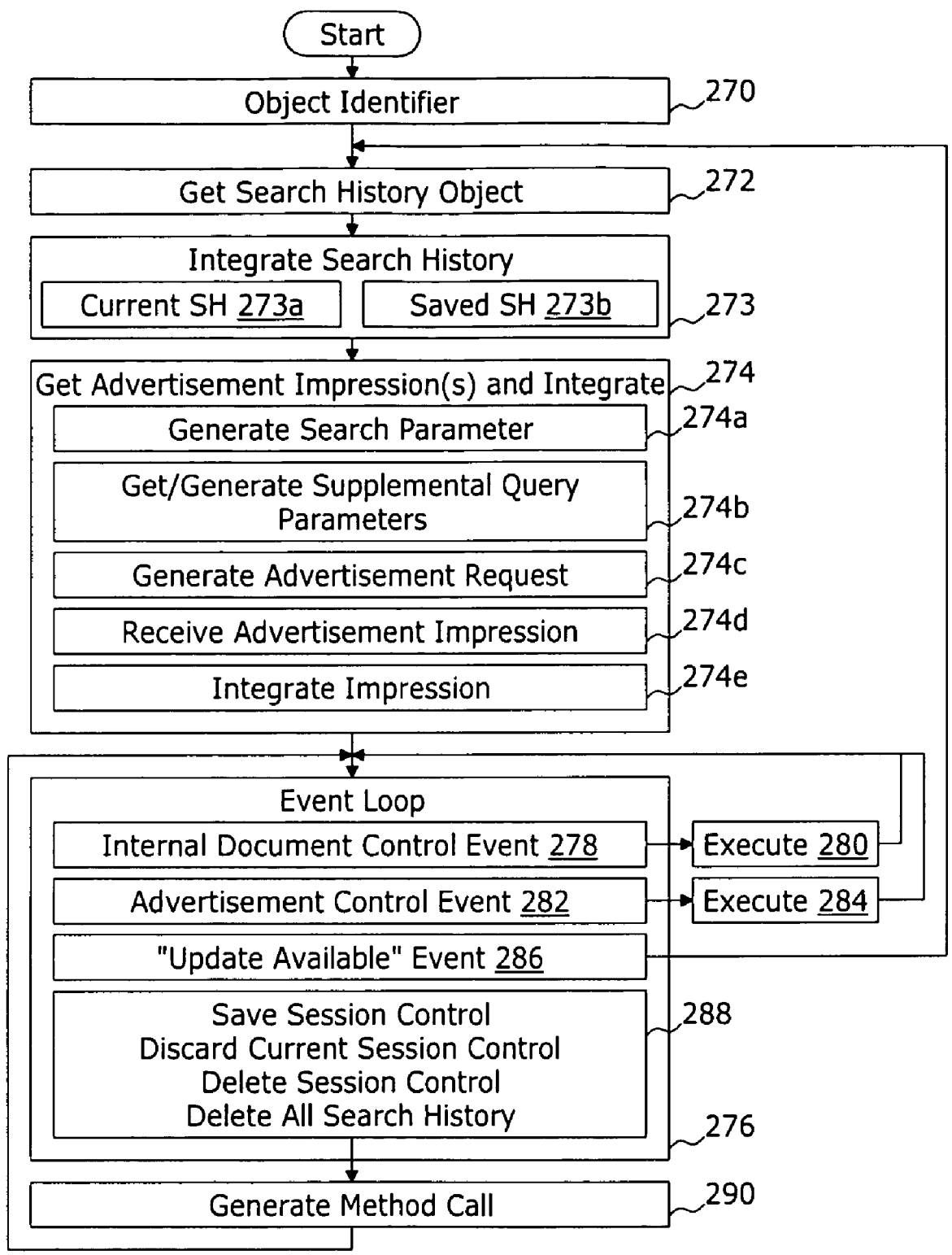
FIG. 4 is flow chart representing exemplary operation of a search history GUI object in accordance with one embodiment of the present invention.

Turning to FIG. 4 in conjunction with FIG. 1 and FIG. 3, step 270 represents the control script 23 obtaining an object identifier for the search history GUI object 16. In more detail, the search history GUI object 16 may generate a getSessionID method call to the search history DLL 12 and obtain, in response, the browser ID of the browser session 43 from which the event that triggered the search history DLL 12 to spawn the search history GUI object 16 occurred (either activation of a tool bar control 47 or the occurrence of a click through event). The search history GUI object 16 will use such browser ID as its object identifier.

Step 272 represents the control script 23 obtaining the search history data of the search history object 15. In the exemplary embodiment, the search history GUI object 16 will generate a getSearchHistory method call to the search history DLL 12 and obtain, in response, the XML file of the search history object 15.

Step 273 represents integrating the search history data of the search history object 15 into the template 25 from which the search history GUI object 16 was spawned for rendering such search history data within the current search history portion 150 and the saved session portion 180 of the search history GUI object 16.

In more detail, step 273a represents rendering of the data of each query node 50 within the session node 46 which includes a session identifier 48 which corresponds to the object identifier of the search history GUI object 16 as search query objects 162 within the current search history portion 150 as previously discussed with respect to FIG. 3.

Step 273b represents rendering of the data of each query node 50 within all other session nodes 46 which include a status identifier 49 indicating a saved status as search query objects 184 within the appropriate temporal objects 181 of the saved search history portion 180 as previously discussed with respect to FIG. 3.

Step 274 represents obtaining one or more advertisement impressions 19 for rendering within the sponsored link and other advertisement portion 188 of the search history GUI object 16. In more detail, for each advertisement impression 19, the search history GUI object 16 may execute the sub steps of step 274 to obtain such advertisement impression 19 from the advertisement system 26.

Each advertisement impression 19 is intended to include targeted advertisement content 13 which is likely to associate with a market and/or a potential need of the consumer to which the advertisement impression 19 will be rendered. To enable the advertisement system 26 to select such targeted advertisement content 13, the advertisement request 11 includes query parameters 57 which are intended to describe a market and/or potential need to which the consumer may be likely to respond.

In one embodiment, the query parameters 57 may include: i) at least a search parameter 57a which is generated at sub step 274a; and ii) optionally may optionally include supplemental query parameters 57b-57d which may be generated or obtained from a supplemental query parameters table 17 at step 274b.

The search parameter 57a may be a word, phrase, or other parameter with commercial significance that associates with a market and/or a potential need of the consumer based on analysis of the rendered search history data. For example, the search parameter 57a may be one or more commercial terms extracted from the most recent query node 50 within the search history. Other examples of the search parameter 57a may include one or more commercial terms selected by their: i) redundancy within multiple query nodes 50; or ii) redundancy within the tagline indicator 64 of multiple result nodes 58 which have been "clicked through" by the user.

Each supplemental query parameter 57b-57d may also be a word, phrase, or other parameter intended to further describe a market, a potential, or advertisement impression characteristic to which the consumer may be likely to respond based on any of: i) a geography parameter 57b describing the geography or location of the consumer; ii) a demographic parameter 57c describing a demographic attribute of the consumer; and/or iii) a behavioral parameter 57d describing past consumer commercial activity and/or responses to advertisements.

The supplemental query parameters 57b-57d may be stored in a supplemental query parameter table 17, an exemplary embodiment of which is represented by FIG. 6. Referring to FIG. 6 in conjunction with FIG. 4, the supplemental query parameter table 17 ma include a category sub table 318 comprising a plurality of records 323. Each record 323 represents a one of the categories of supplemental query parameters 57b-57d. Associated with each record 323 is a parameter table 322 which includes a plurality of record defining the words, phrases, or other parameters which comprise the category query parameter represented by the record.

Returning to FIG. 4 in conjunction with FIG. 6, step 274b represents, for each category of supplemental query parameters 57b-57d to be included in the advertisement request 11, looking up the words phrases, or other parameter stored in its corresponding parameters table 322.

It should be appreciated that the representation of the supplemental query parameters table 17 is exemplary only. It is envisioned that the supplemental query parameters table 17 may be an XML file maintained by the search history DLL 12. In which case, supplemental query parameters 57b-57d may be obtained by the search history GUI object 16 generating an applicable method call (or processing call) to the search history DLL 12 and obtaining the supplemental query parameters 57b-57d there form.

Sub step 274c represents generating an advertisement request 11 to the distribution object 22. The advertisement request 11 includes the query parameters 57 and may include a format identifier 63. The format identifier 63 may include parameters related to how the advertisement impression 19 is to be rendered. For example, the format identifier 63 may specify text based advertisement content, image based advertisement content, and such parameters as size and aspect ratio.

Turning briefly to FIG. 7, the advertisement request 11 may be in the form of an exemplary advertisement request URL 71. The advertisement request URL 71 comprises a predetermined core URL 78, a predetermined URL extension 80, a format parameter 63 in the form of a FormatID value 82, and query parameters 57 in the form of one or more identified query parameter value(s) 86.

The predetermined core URL 78 is a URL recognizable by DNS servers to facilitate routing of an HTTP connection request using the advertisement request URL 71 to a server operating the distribution object 22. An example of a core URL 78 would be "imagelisting.miva.com".

Returning to FIG. 4 in conjunction with FIG. 1 and FIG. 3, step 274d represents receiving the advertisement impression 19 from the advertisement system 26. The advertisement impression 19 will include both advertisement content 13 and response data 34. The advertisement content 13 includes the text, image, or advertisement media which is to be rendered within the search history GUI object 16 for prompting user response to the advertisement impression 19.

The response data 34 may include data useful for determining response content to be rendered on the client system 14 upon user response to the advertisement impression 19. As one example, the response data 34 may be a hyperlink which results in opening a browser window and establishing a connection to a redirect URL of the advertisement system 26 that links to the advertiser's web page. As another example, the response data 34 may include embedded response object for rendering upon user response to the advertisement impression 19.

Step 274e represents integrating the advertisement impression 19 into the search history GUI object 16 such that: i) it is rendering as a one of the advertisement impressions 19a-19e within the sponsored results and other advertisement portion 188; and ii) when it is selected by a user, the search history GUI object 16 initiates rendering of the response content in accordance with the response instructions 34.

After the search history data and the advertisement impression(s) 19 have been integrated and the search history GUI object 16 is rendered on a display of the client system 14, the search history GUI object 16 enters an event loop 276 wherein it commences further action upon the occurrence of various events.

An internal document controls event 278 may include the user activating any of a plurality of the controls of the search history GUI object 16 which effect the display of the search history data such as an expansion control 176, a collapse control 178, a scroll bar control (not shown) or other control that effects the display of data but does not require: i) that the search history GUI object 16 obtain additional, or different, data for display; or ii) update the contents of the search history object 15 to reflect user manipulation of search history data stored therein. Upon the occurrence off an internal document controls event 278, the control code 23 updates and/or modifies search history GUI object 16 accordingly as represented by execute step 280.

An advertisement control event 282 represents the user activating any of the instances of advertisement content 13 displayed within the sponsored results and other advertisement portion 188. In response to such event, the search history GUI object 16 initiates rendering of the response content in accordance with the response data 34 of the selected advertisement impression 19.

An update available event 286 represents receipt of a method call from the search history DLL 12 indicating that search history data stored in the search history object 15 has been updated or, more particularly, could indicate that certain search history data stored in the search history object 15 that would drive an update of the search history data integrated into the search history GUI object 16 has been updated.

In response to an update available event 286, the search history GUI object 16: i) performs step 272 to generate a getSearchHistory method call to the search history DLL 12 to obtain the search history data as previously discussed. Thereafter, steps 273 and 274 are repeated to integrate the search history data into the search history GUI object 16 and, optionally, update one or more of the advertisement impressions 19a-19e based on the newly obtained search history data.

Box 288 represents a plurality of other control events which include: i) user activation of the save session control 177; ii) user activation of a discard current session control 178; iii) user activation of a delete session control 172, or iv) user activation of a delete all search history control 186.

Unlike the internal document control events discussed with respect to box 278, the above described events prompt modification of the search history data stored in the search history object 15. As such, in response to such events, the search history GUI object 16 generates an applicable method call to the search history DLL 12 at step 290 to drive an update of the search history data stored in the search history object 15.

In more detail: i) in response to user activation of the save session control 177, the search history GUI object 16 initiates a saveSession method call to the search history DLL 12; ii) in response to user activation of a discard current session control 178 the search history GUI object 16 initiates a deleteSession method call to the search history DLL 12 ; iii) in response to user activation of a delete control 172 the search history GUI object 16 initiates a deleteTerm method call to the search history DLL 12 identifying the query node to be deleted; and iv) in response to user activation of a delete all search history control 186, the search history GUI object 16 initiates a deleteTerm method call to the search history DLL 12 specifying the query node of each query object 184 within the temporal nodes 181 of the historical search portion 180 of the search history GUI object 16.

Figure 5:
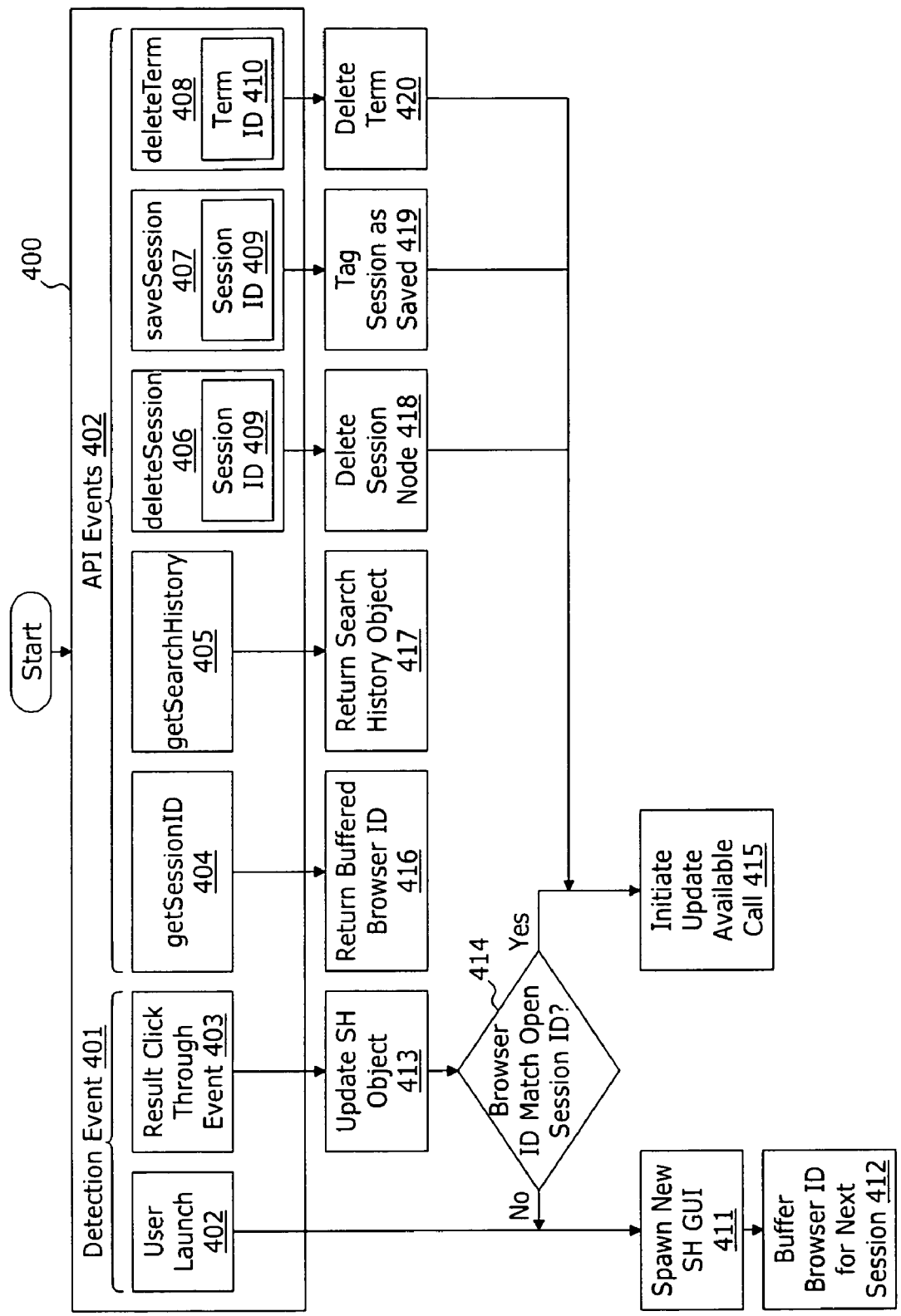
FIG. 5 is a flow chart representing exemplary operation of a search history DLL object in accordance with one embodiment of the present invention.

As discussed, the search history DLL 12 may be launched upon boot up of the client system 14 and at which time it commences operation. Referring to FIG. 5 in conjunction with FIG. 1, upon launch, the search history DLL 12 enters an event loop 400 wherein it commences further action upon the occurrence of various events.

The events may include detection events 401 such as detecting user activation of a toolbar control 47 (referred to as a user launch event 402) and detecting a click through event 403 within an open browser session 43.

In response to a user launch event 402, the search history DLL 12 launches a new search history GUI object 16 in accordance with the template 25 at step 411. Further, at step 412 the search history DLL 12 buffers (or otherwise saves) the browser ID of the browser session 43 in which the user launch event occurred at step 412 such that it may be assigned to the newly launched search history GUI object 16 (as its object identifier) as previously discussed.

Upon detecting a click through event 403, the search history DLL 12 updates, at step 413, the contents of the search history object 15 to include a result node 58 within the query node 50 within the session node 46 corresponding to the result item 45 of the browser session 43 in which the click through event occurred. If the click through event is the first to occur in a particular search or a particular browser session, step 413 may further include writing a new query node 50 and/or a new session node 46 to the search history object 15.

At step 414, the search history DLL 12 determines whether a new search history GUI object 16 is to be spawned. If the click through event is the first in a browser session 43 (or is otherwise occurring in a browser session with a browser ID that does not correspond to an object identifier of an open search history GUI object 16), step 411 is performed and a new search history GUI object 16 is spawned.

If the click through event is in a browser session 43 for which an open search history GUI object 16 already exists, the search history DLL 12 may initiate an Update Available method call to such search history GUI object 16 as represented by step 415.

A getSessionID event 404 is an API event 402 wherein a getSessionID method call is received from a newly spawned search history GUI object 16. In response thereto, the search history DLL 112 returns the buffered browser ID. As such, the newly spawned search history GUI object 16 obtains an object identifier that corresponds to the browser identifier in which user launch event or the click through event that triggered spawning of such search history GUI object 16 occurred.

A getSearchHistory event 405 is an API event 402 wherein a getSearchHistory method call is received from a search history GUI object 16. In response thereto, the search history DLL 112 returns the search history data of the search history object 15 at step 417.

A deleteSession event 406 is an API event 402 wherein a deleteSession method call is received from a search history GUI object 16. The deleteSession method call includes a session ID 409. In response to receiving a deleteSession method call, the search history DLL 12 deletes the session node 46 corresponding to the session ID from the search history object 15 at step 418. Further, because the contents of the search history object 15 has bee modified, an Update Available method call is made to the open search history GUI object 16 at step 415.

A saveSession event 407 is an API event 402 wherein a saveSession method call is received from a search history GUI object 16. The saveSession method call includes a session ID 409. In response to receiving a saveSession method call, the search history DLL 12 updates the status indicator 49 of the session node 46 corresponding to the session ID 409 to a status of "saved" at step 419. Again, because the contents of the search history object 15 has been modified, an Update Available method call is made to the open search history GUI object 16 at step 415.

A deleteTerm event 408 is an API event 402 wherein a deleteTerm method call is received from a search history GUI object 16. The deleteTerm method call includes one or more term IDs 410. Each term ID represents both a session ID and a search query term which, in combination, uniquely identify a query node of the search history object 15. In response to receiving a deleteTerm method call, the search history DLL 12 deletes each query node identified by a one of the term IDs 410 at step 420. Again, because the contents of the search history object 15 has been modified, an Update Available method call is made to the open search history GUI object 16 at step 415.

Returning to FIG. 1, the advertisement system 26 comprises a distribution object 22 and a placement database 24. The distribution object 22 is communicatively coupled to at least one of a plurality of networks (not shown) for: i) receiving advertisement requests 11 from each of a plurality of search history GUI objects 16; and ii) returning, in response to each advertisement request 11, an advertisement impression 19.

As discussed, each advertisement request 11 includes query parameters 57 which are intended to describe a market and/or potential need to which the consumer may be likely to respond and a format identifier 63 including parameters related to how the advertisement impression 19 is to be rendered.

In operation, the distribution object 22 of the advertisement system 26 receives each advertisement request 11 and returns an advertisement impression 19 that includes advertisement content 13 that: i) corresponds to an advertisement category meeting selection criteria determined from the query parameters 57 of the advertisement request 11; ii) is of a rendering type that corresponds to the format identifier 63 of the advertisement request 11; and iv) is associated with a financial parameter meeting financial parameter selection criteria.

The flow chart of FIG. 8 represents exemplary steps performed by the distribution object 22. Referring to FIG. 8 in conjunction with FIG. 1, step 160 represents receipt of an advertisement request 11 from an search history GUI object 16.

Step 161 represents identifying those instances of advertisement content 13 to which the consumer is likely to respond. More specifically, the system 26 searches a placement database 24 to identify those instances of advertisement content 13 which corresponds to query parameters 57 included in the advertisement request 11.

Figure 9:
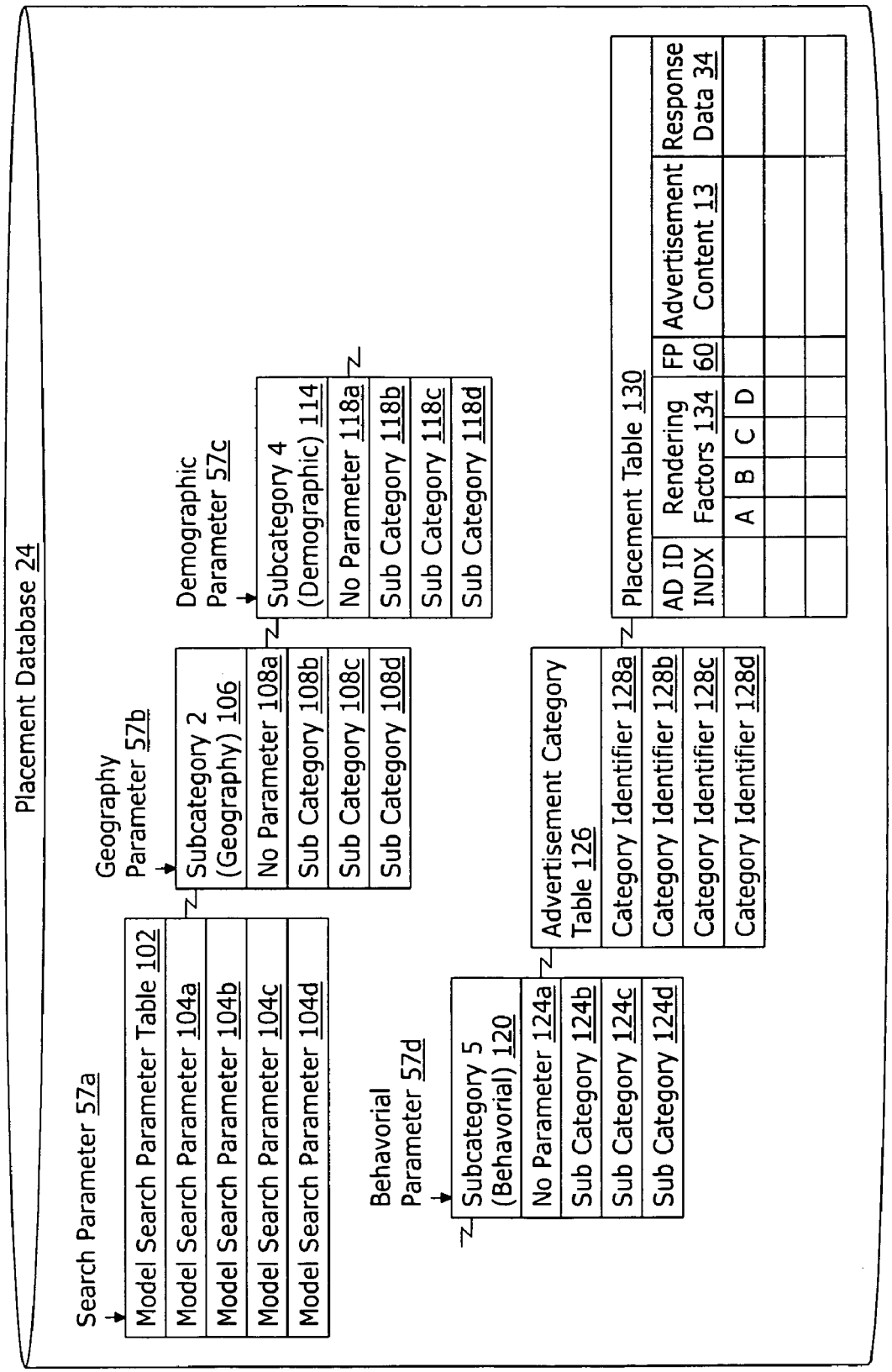
FIG. 9 is a diagram representing an exemplary embodiment placement database in accordance with one embodiment of the present invention.

The diagram of FIG. 9 represents an exemplary structure of the placement database 24. It should be appreciated that there are many database structures and many searching techniques to facilitate locating a record that relates to multiple query parameters 57. The nested table structure represented by the diagram of FIG. 9 is for purposes of illustrating one such technique and is not intended to limit the scope of the invention.

The placement database 24 includes nested levels of model query parameter tables 102, 106, 114, and 120—each of which correspond to a query parameter 57 which may be included in an advertisement request 11. The exemplary query parameters 57 include, but are not limited, to parameters such as: a search parameter 57a; a geography/location parameter 57b; a consumer demographic parameter 57c; and a consumer behavior and/or historical activities parameter 57d.

The first table, or root table, of the placement database 24 is a model search parameter table 102. The model search parameter table 102 stores each of a plurality model search parameters 104. Each model search parameter 104 defines a topical category of advertisement content.

As discussed, each search parameter 57a may be a word, phrase, or other parameter that associates with a market and/or a potential need of the consumer to which the instance advertisement content 13 will for rendered.

When a search parameter 57a is received as part of an advertisement request 11, it is mapped to a topically similar model search parameter 104 of the model search parameter table 102 for purposes of identifying a topical category that corresponds to such search parameter 57a.

Associated with each model search parameter 104 (e.g. associated with each topical category) is a second level of model query parameter tables useful for subdividing such topical category based on another query parameter. In the example of FIG. 9, the second level of model query parameter tables includes a model geographical parameter table 106.

When a geographically parameter 57b is received as part of an advertisement request 11, it is mapped to a corresponding model geography parameter 108 to select a subcategory of advertisement content which may be useful to the consumer or to which the consumer is likely to respond based on geography.

For example, each model geography parameter 108 may be a zip code. In which case, a geography parameter 57b, whether a zip code or other indicator of geographical location, may be mapped to those corresponding zip codes.

It should also be appreciated that one geographical subcategory 108a is a sub category of advertisement content which may be useful to the consumer or to which the consumer is likely to respond in a situation wherein the advertisement request 11 includes no geography parameter 57b.

Associated with each model geography parameter 108 is a third level of model query parameter tables useful for further subdividing based on another query parameter. In the example of FIG. 9, the third level of model query parameter tables includes a model demographic parameter table 114.

When a demographic parameter 57c is received as part of an advertisement request 11, it is mapped to a corresponding model demographic parameter 118 to define a subcategory of advertisement content which may be useful to the consumer or to which the consumer is likely to respond based on a demographic parameter.

Again, it should also be appreciated that one demographic subcategory 118a is a sub category of advertisement content which may be useful to the consumer or to which the consumer is likely to respond in a situation wherein the advertisement request does not include the applicable demographic parameter 57c.

Associated with each model demographic parameter 118 is a fourth level of model query parameter tables useful for further subdividing based on another query parameter. In the example of FIG. 9, the fourth level of model query parameter tables includes a model behavioral parameter table 120.

When a behavioral parameter 57d is received as part of an advertisement request 11, it is mapped to a corresponding model behavioral parameter 124 to select a subcategory of advertisement content which may be useful to the consumer or to which the consumer is likely to respond based on such behavioral parameter.

Again, it should also be appreciated that one behavioral subcategory 124a is a sub category of advertisement content which may be useful to the consumer or to which the consumer is likely to respond in a situation wherein the advertisement request does not include the applicable behavioral parameter 57d.

This nested structure of subdividing each topical category based on each query parameter 57 is repeated for each query parameter 57 included in the advertisement request 11. Associated with the final subcategory, in this example the subcategory defined by the model behavioral parameter 124 is an advertisement category table 126.

The advertisement categories 128 listed in the advertisement category table 126 define those advertisement subject matter categories 128 that meet such advertisement category selection criteria by associating with each query parameter 57 included in the advertisement request 11.

Associated with each advertisement subject matter category 128 is a placement table 130. Each record of the placement table represents an instance of advertisement content 13 that is within such advertisement subject matter category 128.

As such, the result of applying each query parameter 57 to the placement database 24 is to identify a plurality of instances of advertisement content 13 that meet advertisement category selection criteria by nature of being represented by records in one or more placement tables 130 which link to the advertisement subject matter categories 128 that correspond to all query parameters 57 included in the advertisement request 11.

The placement table 130 may further associates rendering factors 134 with each instance of advertisement content 13. Rendering factors 134 may identify, with respect to the instance of advertisement content 13; i) its file format; ii) a size; iii) an aspect ratio, and/or iv) other factors suitable for determining whether the content 13 would be applicable for rendering in, on, or through a particular media for which the advertisement is requested.

At step 162, the system 26 selects those records of the placement table 130 wherein its rendering factors 134 correspond to the format identifier 63 of the advertisement request 11 and/or the channel identifier 31.

Step 163 represents selecting advertisement content, from those instances of advertisement content meeting the advertisement category selection criteria at step 161 and meeting the rendering format selection criteria at step 162, those that are associated with a financial parameter meeting financial parameter selection criteria.

Figure 10:
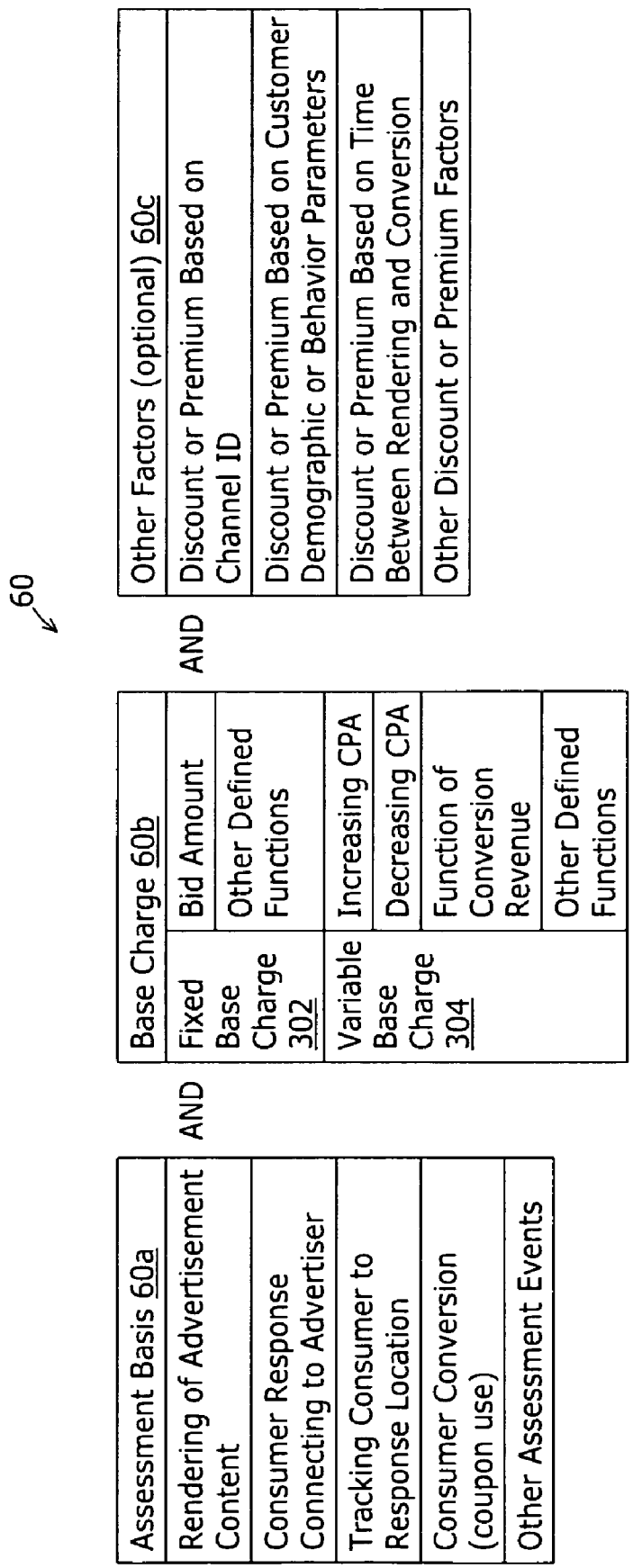
FIG. 10 is an exemplary table structure for associating an instance of advertisement content with a financial parameter in accordance with one embodiment of the present invention.

Turning briefly of FIG. 10, the financial parameter 60 may comprise such parameters as an assessment basis 60a, a base charge 60b, and other financial factors 60c for providing a basis for determining a charge assessable to the advertiser upon the occurrence of an assessment event related to the instance of advertisement content.

The assessment basis 60a defines the event triggering assessment of the charge to the advertiser. Exemplary assessment events include: i) rendering of the instance of advertisement content; ii) consumer response to the advertisement content (for example clicking on an advertisement impression and linking to the advertiser's web page); iii) consumer response by entering into a transaction to purchase goods or services from the advertiser and such transaction is linked to consumer response to the advertisement (e.g. commonly called conversion); and iv) other assessment events related to the rendering of the instance of the advertisement content or the consumer taking action in response thereto.

The base charge 60b may be either a fixed base charge 302, a variable base charge 304, or information useful for looking up, calculating, or otherwise determining a fixed base charge 302, a variable base charge 304 other base compensation scheme.

Examples of a fixed base charge 302 include: i) a bid amount associated with an instance of advertisement content; and ii) other functions in which the charge assessable to the advertiser is the same each time the assessment event occurs with respect to the same instance of advertisement content.

Examples of a variable charge 304 may include charges which are a function of: i) a charge which increases or decreases as a function of the number of times the instance of advertisement content is rendered, ii) which are based a function of conversion revenue (revenue on a commercial transaction that is a result of consumer response to the instance of advertisement content); or iii) other functions in which the charge assessable to the advertiser may be different each time the assessment event occurs with respect to the same instance of advertisement content.

Exemplary other factors 60c are functions useful for altering the assessment charge based on factors relevant to the advertisement. Examples include: i) functions for discounting or providing a premium based on delivery of the instance of advertisement content through a particular media; ii) functions for discounting or providing a premium based on delivery of the instance of advertisement content for rendering based on customer demographics and/or behavior patterns (based on query parameters 57); and iii) functions for discounting or providing a premium based other advertisement related factors.

The financial selection criteria may specify selecting the instance of advertisement content 13 having a favorable financial parameter 60, for example the highest assessable amount (or estimated or predicted highest assessable amount) based the base charge 60a, assessment basis 60b, and/or other factors 60c.

In another example, the financial selection criteria may specify selecting, on a rotating basis, one of a plurality of instances of advertisement content 13. U.S. patent application Ser. No. 10/724,546 filed on Aug. 19, 2004 and commonly assigned with the present application describes systems and methods for selecting one of a plurality of instances of advertisement content. The contents of such application is incorporated herein.

Returning to FIG. 8 in conjunction with FIG. 1, step 164 represents combining the advertisement content 13 with response data 34 to generate an advertisement impression 19 for return to the search history GUI object 16. In more detail, the response data 34 may be a URL directly to the advertisers web site in accordance with the response instructions or, may be a URL to a record in a re-direct database controlled by the advertisement system 26—which in turn links to the URL of the advertiser's web site. Such redirect system enables the advertisement system to track consumer response to advertisement impressions.

It should be appreciated that the above described systems and methods provide a convenient and useful means for rendering and managing search results and delivering targeted advertisement content for rendering therewith.

Although the invention has been shown and described with respect to certain exemplary embodiments, it is obvious that equivalents and modifications will occur to others skilled in the art upon the reading and understanding of the specification. The present invention includes all such described equivalents and modifications, and is limited only by the scope of the following claims.

What is claimed is:

1. A client computer system for managing search results provided by each of a plurality of remote search engines and providing targeted advertisement content, the client computer system comprising:

a processor executing software code, the software code comprising a web browser adapted to launch a plurality of browser sessions,
  wherein each browser session is identified by a browser identifier and adapted to maintain a search session,
  wherein each search session includes at least one query session,
  wherein each query session comprises: i) posting a search query to a selected remote search engine; ii) receiving at least one search result item returned by the selected remote search engine; and iii) generating a display of the search query and the at least one search result item in the browser session;

a storage storing a search history file on the client computer system, wherein the search history file comprises a plurality of search session nodes, wherein each search session node associates with a selected one of the browser sessions and comprises:
  the browser identifier of the selected one of the browser sessions; and
  a plurality of query nodes, wherein each query node represents one of the query sessions of the search session maintained by the selected one of the plurality of browser sessions, and includes:
    an identification of the selected remote search engine;
    an indication of the search query posted to the selected search engine;
    an indication of the at least one result item returned by the selected search engine; and the software code executed by the processor further comprises a search result management system, the search result management system comprising:
  a search history monitoring object configured to monitor the web browser and, for each query session of each browser session:
    capture the search query and the at least one search result item; and
    write, to the session node with a browser identifier matching the browser identifier of the browser session in which the search query occurred:
      the indication of the search query posted to the selected search engine; and
      the indication of the at least one result item returned by the selected search engine; and
  a search history display object adapted to:
    generate a search session display comprising, for each query node of each search session node of the search history file:
      the identification of the selected search engine;
      the indication of the search query; and
      the indication of the at least one search result item; and
    generate an advertisement request to a distribution object, the advertisement request including query parameters;
    receive an advertisement impression from the distribution object; and
    display, in a second user interface object distinct from the search session display; the advertisement impression returned by the distribution object; and wherein the query parameters being commercial terms extracted from at least one query node of the search file stored on the client computer system.

2. The system of claim 1, wherein the query parameters are commercial terms from the most recent query node stored in the search file.

3. The system of claim 1, wherein the query parameters are commercial term that are redundant in multiple query nodes stored in the search file.

4. The system of claim 1, wherein:
each result item each includes an indication that the result item was clicked-through by the user in the browser session; and
the query node further includes a date/time indicator which identifies the date and time the result items was clicked-through by the user; and
wherein the query parameters are commercial term that are redundant in multiple query nodes which include result items clicked-through by the user of the display.

5. A method of operating a computer for managing search results provided by each of a plurality of remote search engines and providing targeted advertisement content, the method comprising:
capturing each query session of each of multiple web browser search sessions, each query session being with a selected search engine, the selected search engine being a one of the plurality of remote search engines, each query session comprising: i) posting a search query to the selected search engine; ii) receiving at least one search result item returned by the selected search engine; and iii) displaying the search query and the at least one search result item within the web browser search session; and wherein capturing each query session comprises capturing the search query and the at least one search result item from the query session;
writing each query session to a search history file, wherein the search history file comprises a plurality of search session nodes, wherein each search session node associates with a selected one of web browser search sessions and comprises:
the browser identifier of the selected one of the web browser search sessions; and
a plurality of query nodes, wherein each query node represents one of the query sessions of the web browser search session, and includes:
an identification of the selected remote search engine;
an indication of the search query posted to the selected search engine; and
an indication of the at least one result item returned by the selected search engine; and
wherein writing each query session to the search history file comprises:
capturing the search query and the at least one search result item; and
writing, to the session node with a browser identifier matching the browser identifier of the web browser search session in which the search query occurred:
the indication of the search query posted to the selected search engine; and
the indication of the at least one result item returned by the selected search engine; and
generate a search history display comprising, for each query node of each search session node of the search history file:
the identification of the selected search engine;
the indication of the search query; and
the indication of the at least one search result item; and
generating an advertisement request to a distribution object, the advertisement request including query parameters;
receiving an advertisement impression from the distribution object;
displaying, in a second user interface object distinct from the search history display the advertisement impression returned by the distribution object; and
wherein the query parameters being commercial terms extracted from at least one query node of the search history file.

6. The method of claim 5, wherein the query parameters are commercial terms from the most recent query node stored in the search history file.

7. The method of claim 5, wherein the query parameters are commercial terms that are redundant in multiple query nodes stored in the search history file.

8. The method of claim 5, wherein:
each result item includes an node including the indication that the result item of the at least was clicked-through by the user in the browser session; and
the query node further includes a date/time indicator which identifies the date and time the result items was clicked-through by the user; and
wherein the query parameters are commercial terms that are redundant in multiple query nodes that include result items clicked-through by the user query.

* * * * *